INVENTOR.
ELOF A.B. HOJDING
BY
SPARROW AND SPARROW
ATTORNEYS

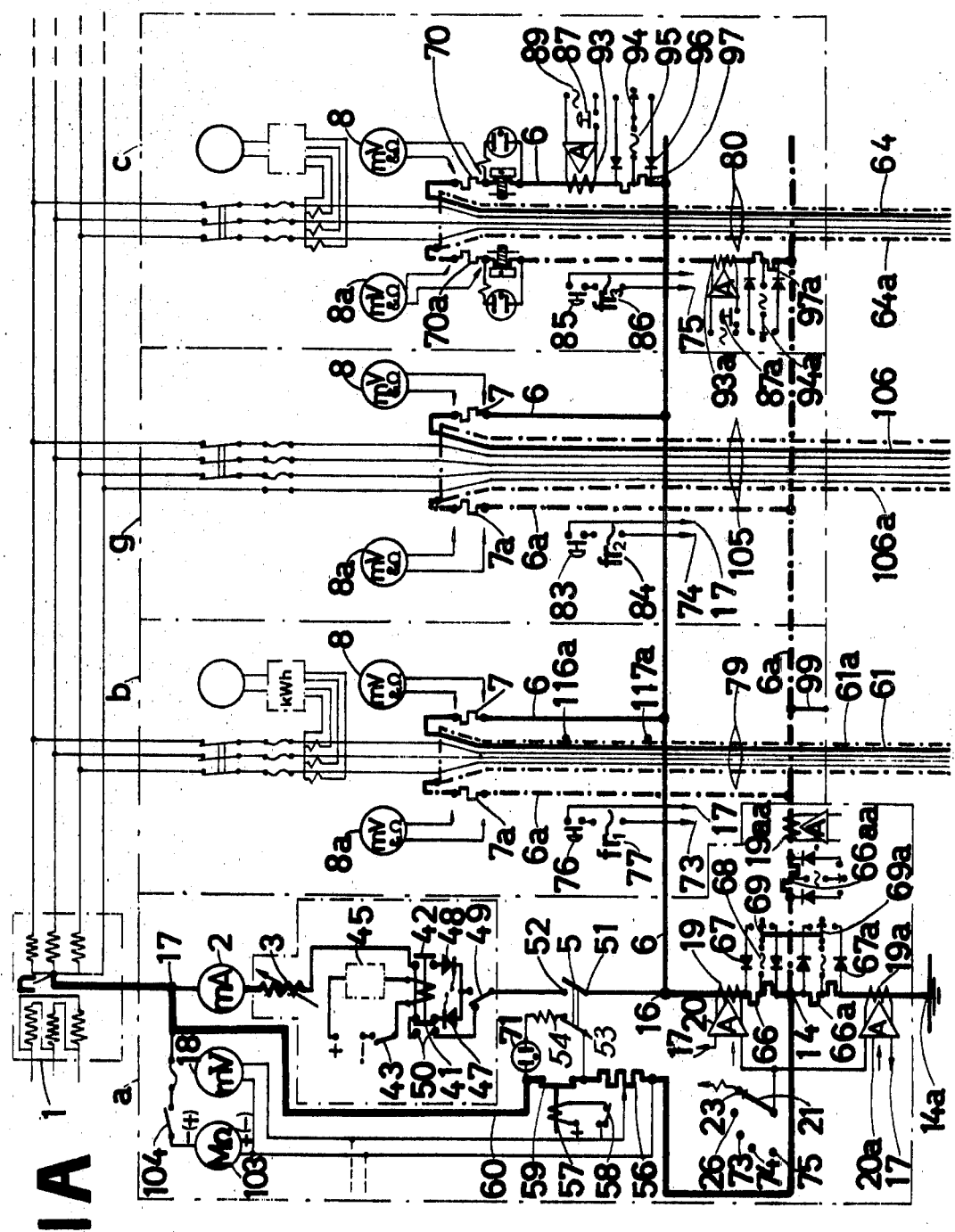

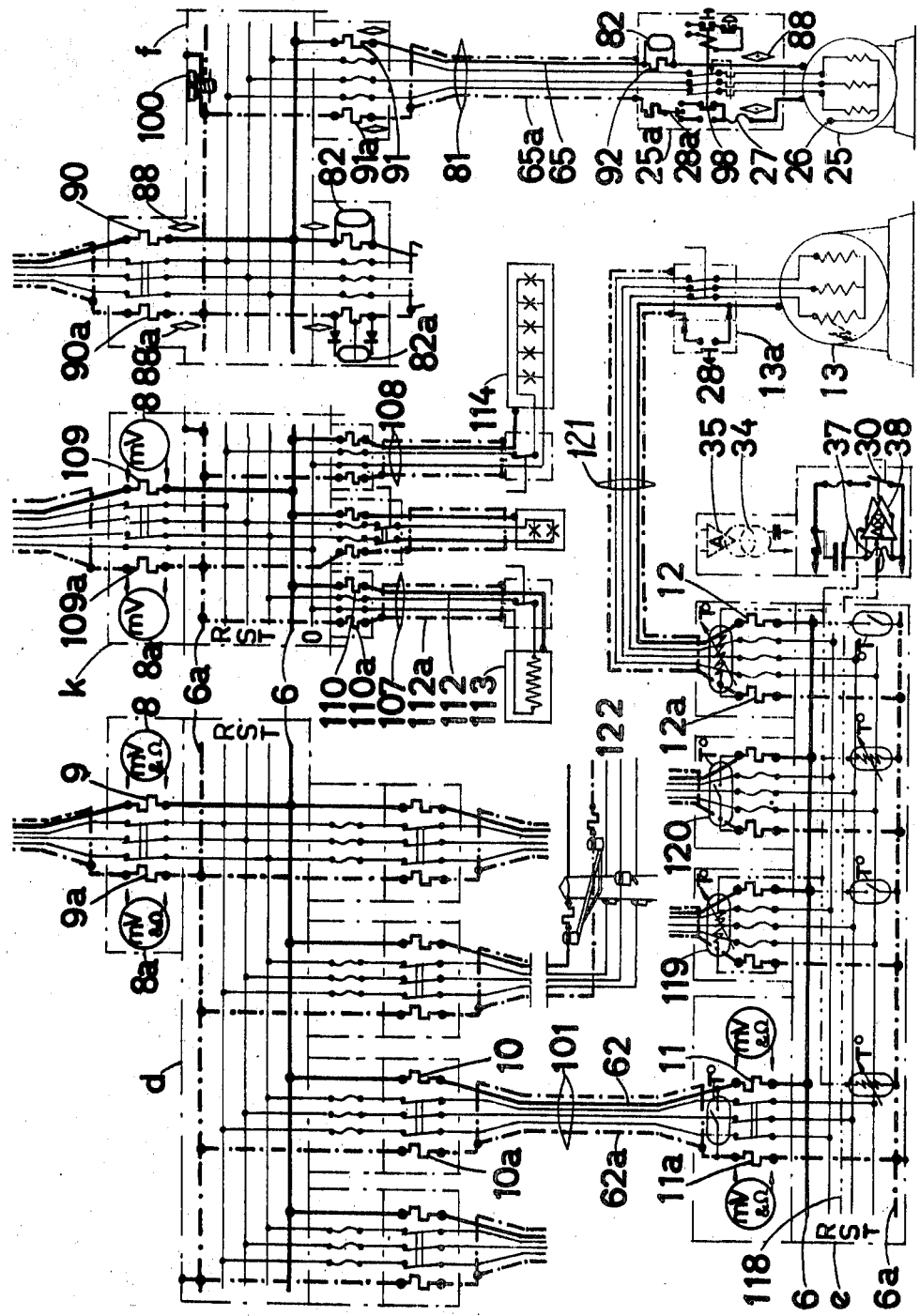

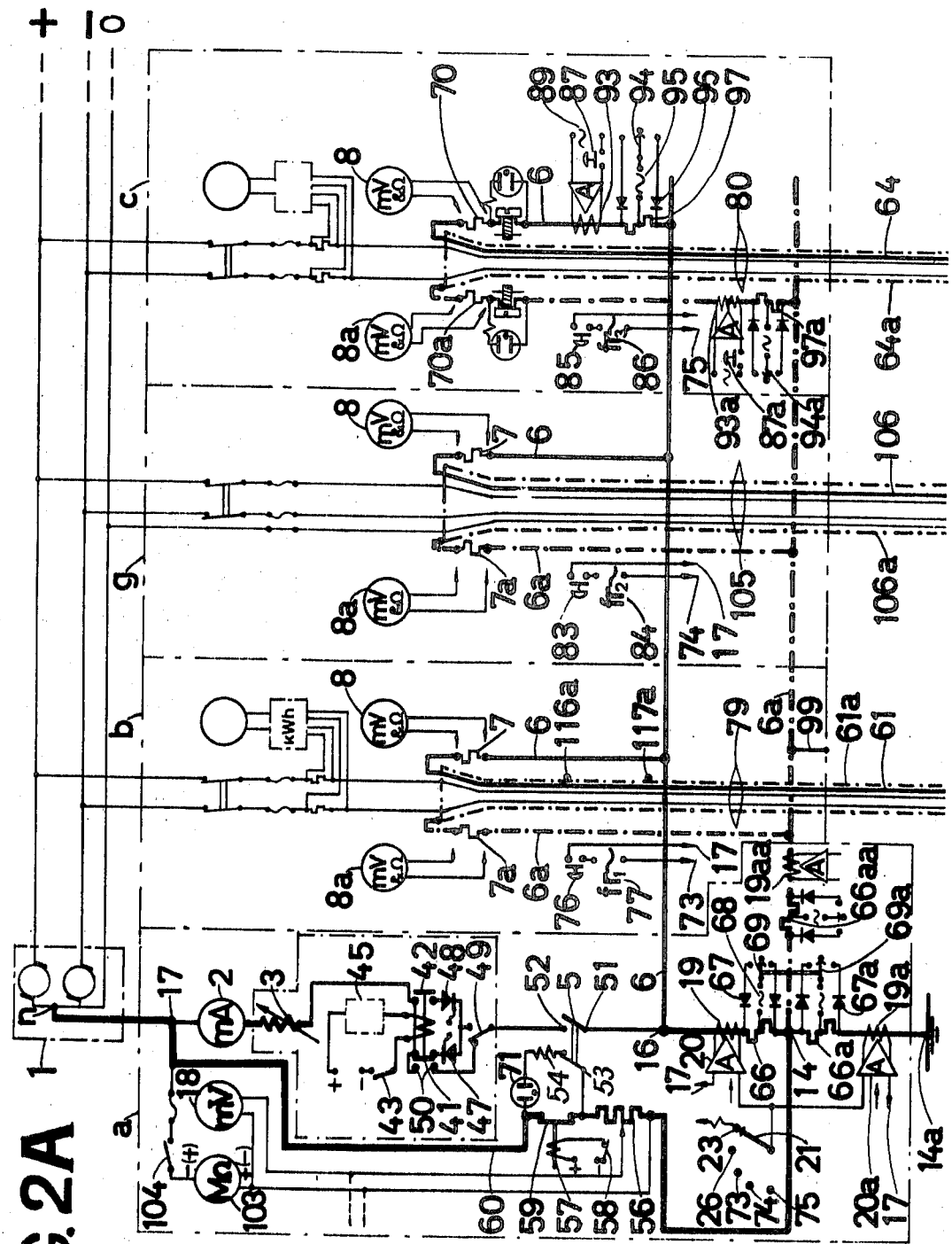

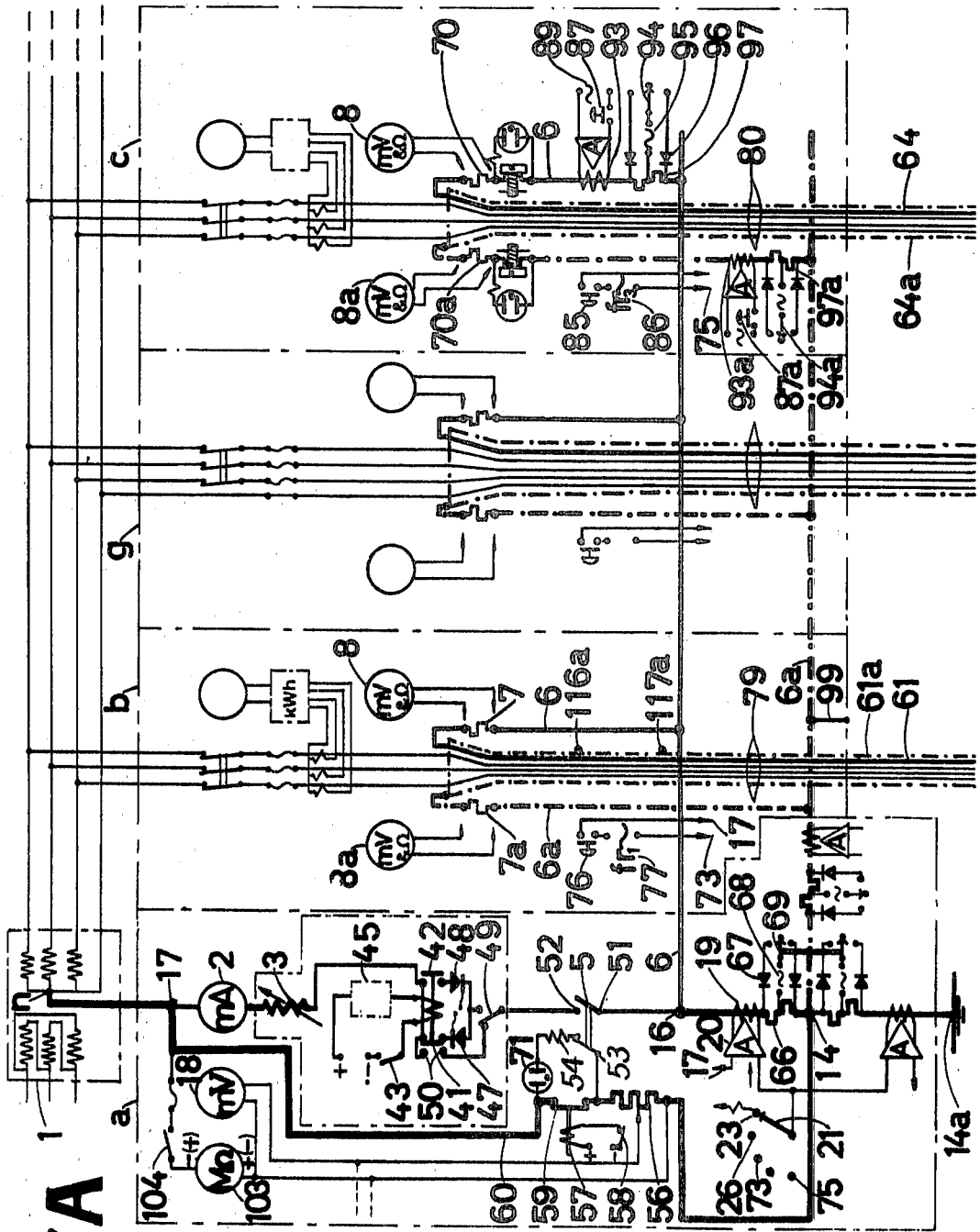

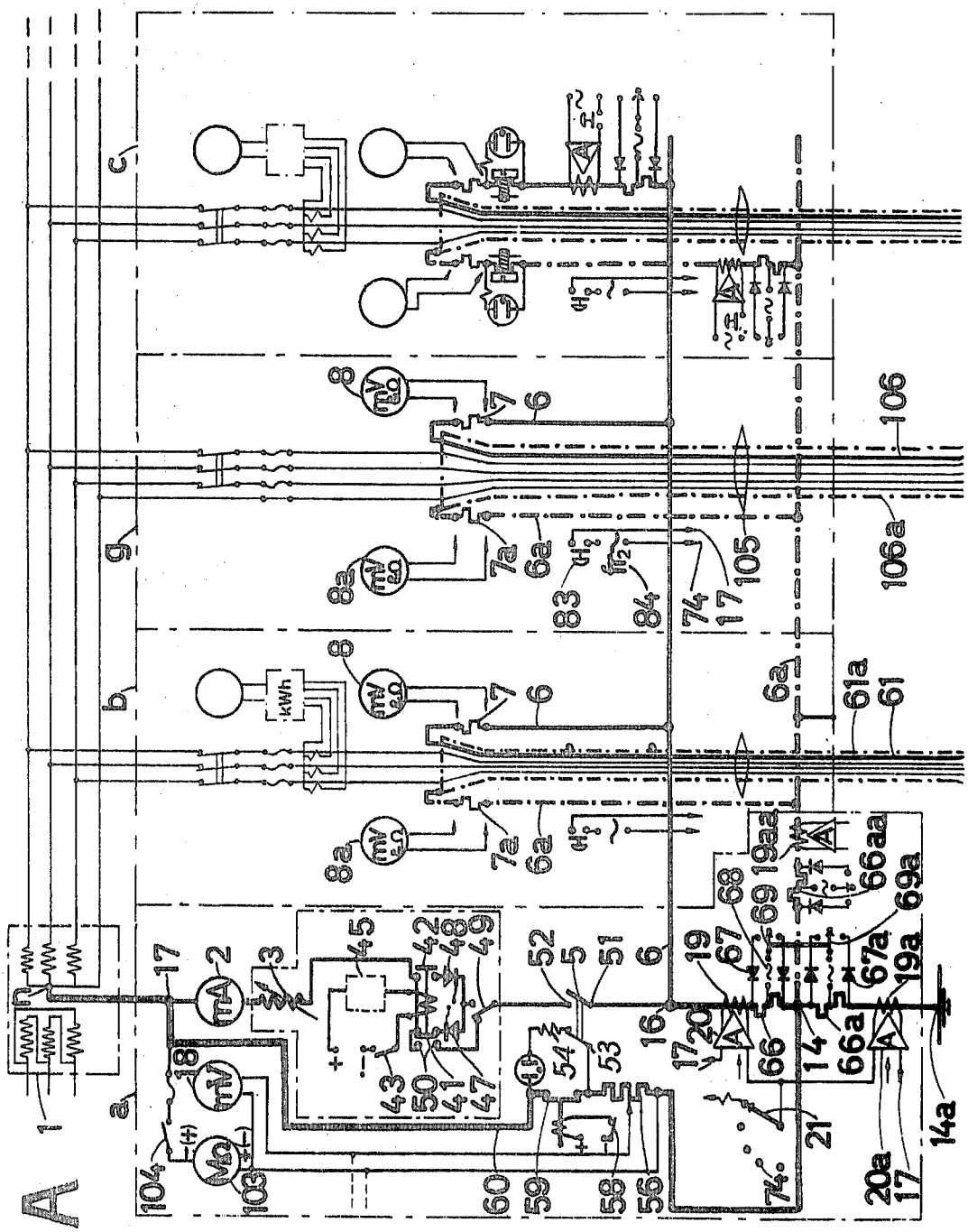

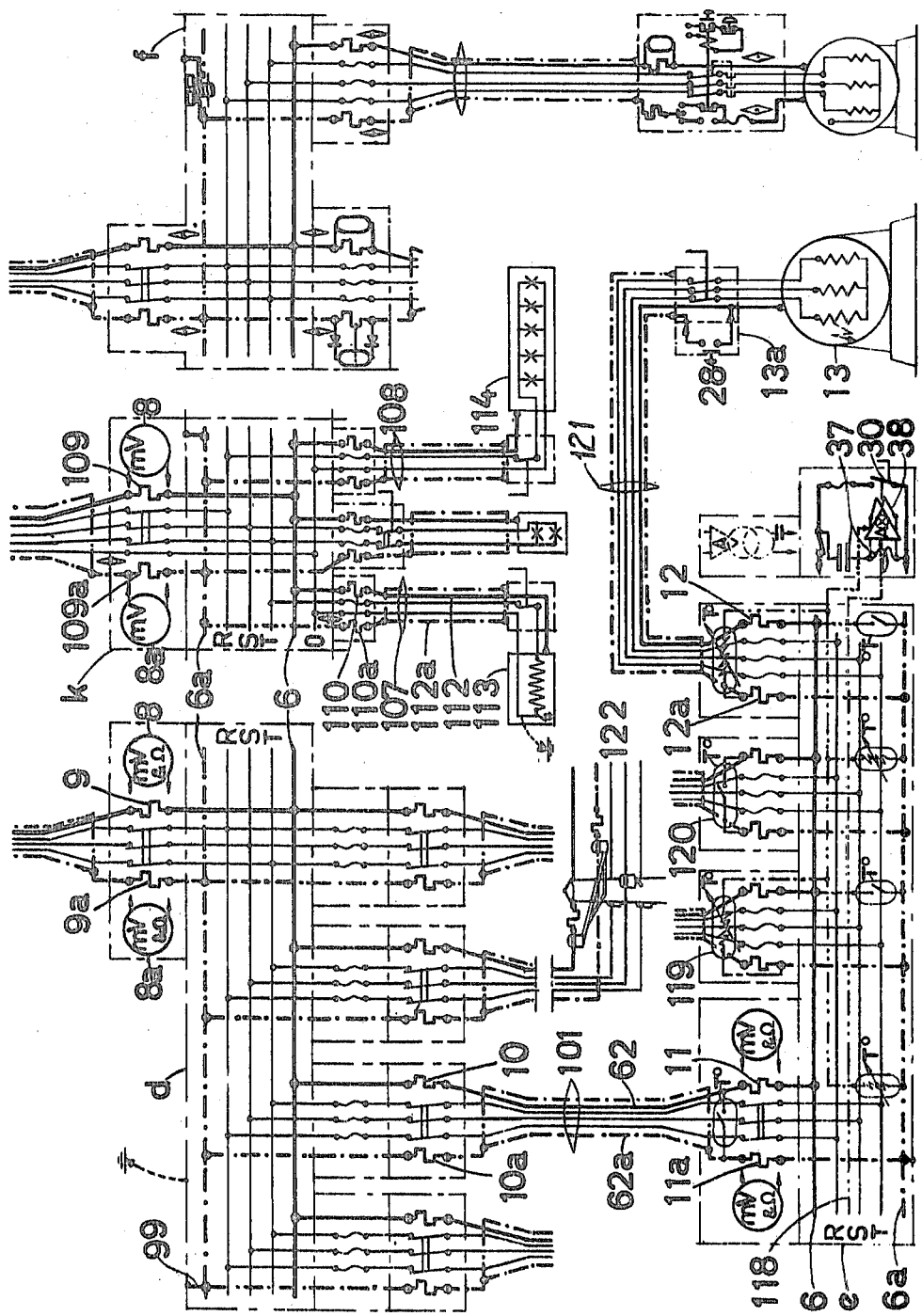

United States Patent Office 3,560,850
Patented Feb. 2, 1971

3,560,850
SYSTEMS FOR DETECTING AND LOCATING BEGINNING FAULTS IN ENERGIZED ELECTRIC NETWORKS
Elof A. B. Hojding, Vapengatan 9, S–12652,
Hagersten, Stockholm, Sweden
Filed June 26, 1968, Ser. No. 740,332
Int. Cl. G01r 31/08
U.S. Cl. 324—52
10 Claims

ABSTRACT OF THE DISCLOSURE

Ground fault or insulation fault and joint continuity faults electrical detecting devices for large, extended plants and installations. Detecting localizing and continuously supervising devices extending over both ungrounded and grounded A.C. as well as D.C. systems having further current carrying zero wires. A system for detecting and locating disturbance sources or faults in the running of a plant and in the surroundings before the faults have grown or advanced into injuries, by making use of protective conductor circuits of the live electric networks of the plant.

BACKGROUND OF THE INVENTION

The invention relates to improvements in electric systems disclosed in applicant's U.S. Pat. 3,031,613 dated Apr. 24, 1962 and Canadian Pat. 657,832 dated Feb. 19, 1963. Patent applications corresponding to the present U.S. patent application were filed in Canada, Feb. 18, 1963, application No. 869,052 (now Pat. No. 795,922, dated Oct. 1, 1968), in Sweden, application No. 4,519/62, Apr. 23, 1962 (now Pat. 305,259, dated Jan. 30, 1969), in Norway, application No. 2,771/68, filed July 12, 1968, in Finland, application No. 2,138/68, filed July 29, 1968 and in Denmark, application No. 3,427/68, filed July 15, 1968.

SUMMARY

Objects and advantages of the invention will be set forth in part hereafter and in part will be obvious herefrom or may be learned by practicing the invention, the same being realized and attained by means of the instrumentalities and combinations pointed out in the appended claims. The invention consists in the novel parts, construction arrangements, combinations and improvements herein shown and described.

It is an important object of this invention to provide contrivances for detecting and locating a ground fault in continuously running industrial plants as soon as possible and as long as such a leakage to ground is only single poled.

It is another object of this invention to provide for improved means for centralizing a consistent control of the energized electric networks of such industrial plants.

A further object of this invention is to provide electric means of various frequencies for the continuous supervision of the condition of the networks including indicating means for detecting of poor contacts, beginning insulation defects causing rising temperatures, smoke, fires and the like.

Yet another object of this invention is to provide for a plurality of parallel arranged disturbances neutralizing devices in such networks in order, among others, to increase the sensitivity and reliability in fault-detecting and locating.

Furthermore, it is an object of this invention to provide for new and useful means and combinations of means for indicating electrochemical disturbance and registering electric leakage faults in such plants.

Various further and more specific purposes, features and advantages will clearly appear from the detailed description given below taken in connection with the accompanying drawings which form part of this specification and illustrate merely by way of example one embodiment of the device of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the figures of the drawing, wherein FIGS. 1A and 1B show a diagram with complete reference characters of the arrangement according to the invention, applied to a high- or low-ohmic grounded three-phase, four-wire A.C. network including a zero wire, and using four- and five-wire cables with internal metallic covers; and shows also an overhead line;

FIGS. 3A and 3B and 4A and 4B show the diagram of FIGS. 1A and 1B, but with several reference characters removed for clarity; and FIGS. 2A and 2B show a diagram with complete reference characters of the arrangement according to the invention but applied to a high- or low-ohmic grounded three wire D.C. network including a zero wire and using three- and four-wire cables and an overhead line.

DESCRIPTION OF THE PREFERRED EMBODIMENTS

Figure 2B:
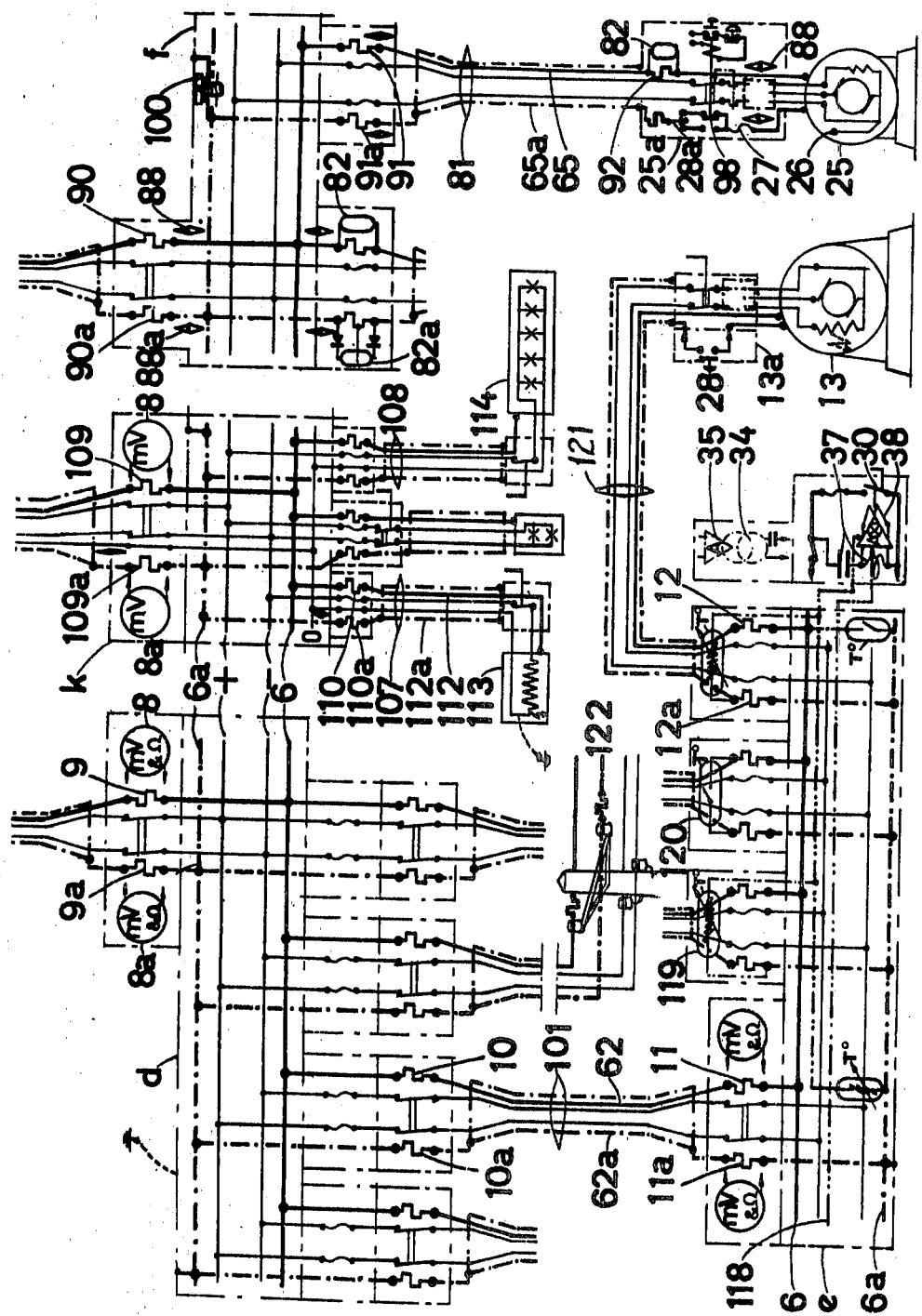

Referring now in more detail to the drawing illustrating a preferred embodiment by which the invention may be realized, there is in FIGS. 1A and 1B an arrangement for signalling, tracing and locating a leakage in energized electric networks applicable to a three-phase four-wire system, having three phase-wires and a current carrying zero conductor. FIGS. 1A and 1B also show new details and arrangements, most of which may additionally be used also in connection with the systems as described in my Pat. No. 3,031,613, dated Apr. 24, 1962.

The neutral point of said network may consist of the impedence 56 either low- or high-ohmicly, connected to the protective conductor system 6, 6a, that is, to the leakage current conductor systems, corresponding to the net voltage size and prescriptions of applicable electricity safety regulations; said protective conductor systems having low-ohm grounding if said regulations so prescribe. FIG. 1A shows a low-ohm grounding electrode 14a connected in one place 14, 16 to the leakage current bus bars 6, 6a of the switchgear. The protective conductor systems of the network thus are shown low-ohm grounded, but the shown grounding of the neutral point n can symbolize both low- and high-ohm grounding, and FIG. 1A thus symbolizes, and is applicable to a grounded as well as an ungrounded or high-ohm grounded electric line system, and the function of this invention is principally independent of whether said point n is a neutral point or not.

FIGS. 1A and 1B also show single-phase connections of load objects not only conventional in two-phase wires of the network, but also, as for instance, according to Swedish practice, connected to one phase wire and a "zero-wire," a neutral conductor, the latter being connected to current carrying (live) zero-bus bars in distributing boxes and to the current carrying (live) zero-bus bar in the switchgear, said zero-bus bar being directly connected to the neutral point of the power source.

According to FIGS. 1A and 1B the electric fault locating and controlling systems consist of the following details. The bus bars RST of the power source 1 are provided with a live fourth bus bar, the zero bus bar, labelled 0 (zero), and the primary winding of the transformer 1 is shown in triangle connection by way of example. In the cell $a$ is a resistor 56, described as follows, and further there is an automatic breaker 59 with its coil 57 and switch 58, the poles of the breaker 59 being shunted to a control neon tube 71 over the one branch 53, 54 of the throw-over switch 5. The breaker 59 is connected in series to a current-limiting device, such as a resistor, reactor or impeder 56, serving also as a shunt to the millivolt- or voltmeter 18, said breaker 59 and resistor 56 in series connected in 17 to the neutral point $n$ of the power source 1 by means of the conductor 60, and to the bus bars of the leakage current wires 6 and the cable sheaths 6$a$ at their joint connection 14.

In the cell $a$, 103 denotes a megohm-metering instrument in series to a switch 104 connected to 17 and 14. The elements 20$a$, 20$aa$ and 19$a$, 19$aa$ represent an amplifier and a bus bar transformer respectively.

In the cell $a$, there are three resistors (or reactors or impeders), 66 (to only one of which is given a reference character for clarity), each of them fed by a direct current signal source, shown as rectifying and reversing devices, are the rectifiers 67, 67$a$; there being three alternating current signal sources 68 (to only one of which is given a reference character for clarity); the said sources consisting also of condensers or batteries, operated for reversing by the throw-over switches 69, 69$a$, each of them or both in the same polarity. The selector switch 21 is provided with other contacts 73, 74, 75. Element 14$a$ denotes the ground electrode.

Furthermore, in the cell $a$, 49 denotes a throw-over switch, and 50 are contacts operated by 41. Elements 47 and 48 are general symbols for rectifiers which also may consist of electronic tubes or transistors. Element 45 symbolizes principally an apparatus with an interrupting function.

In the cell $b$ the terminals 116$a$ and 117$a$ exemplify using of the resistance of a length of a cable sheath as a substitute of a measuring resistor.

In the cells $b$, $g$ and $c$, 76, 83, 85 represent push buttons for centralized and automated continuity control connected in series with testing signal current sources 77, 84, 86, respectively, the circuits having terminals 73, 74, 75, respectively, and 17, respectively.

In the cell $c$ there are furthermore arranged, connected in the protective conductor circuits, individual amplifiers with transformers 93, 93$a$ and push buttons 87, 87$a$, and two testing sources 89 (only one of which is given a reference character for clarity), furthermore resistors 97, 97$a$, which also may be reactors or impeders, fed each by an A.C. or D.C. testing source 95, which also may consist of condensers or batteries in series with throw-over switches 94, 94$a$ and rectifiers 96. In the distributing box $d$ is shown at 122 an application of an overhead line having two wires used as leakage and protective conductors 6, 6$a$.

In the distributing box $e$ there is disposed a tuned circuit 37 connected to an amplifier A feeding a coil 38 of a closing switch 30. The starting apparatus 13$a$ has been provided with a push button 28 for closing.

Furthermore, in the distributing box $f$ the connection 99 has been replaced by a contacting device 100. Further, electrochemical indicating devices 82, 82$a$ are disposed.

The starting device 25$a$ is shown as a conventional contact motorbreaker, provided with two measuring resistors 92 (to only one of which is given a reference numeral for clarity), electrochemical indicators 82 and 82$a$ (the latter shown in $f$). The starting device 25$a$ is further provided with magnetic bars 88, 88$a$, an automatically operated two-way switch 98 and a manually operated two-way selector switch 28$a$ with a neutral position. The motor 25 is shown as equipped with two separated terminal points on its frame, the one for the incoming leakage current wire 65, and the other for its return from the frame through the starting device 25$a$ in series with a fuse 27, the switches 98 and 28$a$ and one of the measuring resistors 92 to the leakage current branch 65$a$.

In the cell $g$ the power network is shown somewhat differing from those in the cells $b$ and $c$ in that the outgoing cable 105 has four and not three normally current carrying conductors, one of them being a zero-conductor. 106 represents the leakage current wire and 106$a$ the cable sheath. The cable is feeding the distributing box $k$, which contains, besides the bus bars 6, 6$a$ and its measuring resistors 109, 109$a$, four normally current carrying bus bars R–S–T–0. One of the outgoing cables in the distributing box $k$, the cable 107, is shown having a leakage current wire 112 with a cable sheath 112$a$ connected in series to the measuring resistors 110, 110$a$, respectively. The cable feeds a heater 113 by the conductors T and 0 (zero-conductor). The same is the case concerning the cable 108, which is feeding a bulb panel 114 by R and 0. Another bulb panel without reference number is shown connected to the phases S and T in another group.

The various functions according to FIGS. 1A and 1B and partly according to the simplified FIGS. 3A and 3B and 4A and 4B closely described in the following:

The method of tracing and locating ground faults in networks according to FIGS. 1A and 1B does not substantially differ from the method as described in my copending application Ser. No. 693,083, FIG. 4, with the following exception.

In FIGS. 1A and 1B are shown the normal positions of switches, closed or open as the case may be, when no leakage exists in the plant.

If, however, a leakage should arise in the motor 13, the millivoltmeter 18 in the switchgear cell $a$ would show a deflection and an alarm relay would be released.

While tracing and locating the ground fault, the breaker 59 shall be disconnected by manually opening the switch 58; after that the throw-over switch 5 shall be thrown over to the left. Under the presumption that the leakage current-limiting device 3 is automatically working, the pulser-interrupter 45 with its two-way changing contacts 42, 41 have to be started by closing the switch 43. With the throw-over switch 49 in the position to the left as shown, the leakage current will not be rectified, but will remain an A.C. current repeatedly interrupted. The millivoltmeter 8 in the cell $b$ will then show rhythmic deflections caused by the pulsating leakage current emanating from 13, and the tracing of it will be continued in the distributing box $d$ in the measuring points 9, 10 and in the distributing box $e$ in the points 11 and 12. The leakage must thus emanate from 13.

Testing for undesired open or unstable connections, even as far as to a starting apparatus or a motor, in the protective circuits, the two protective branches 6, 6$a$ also may be laid out earlier described with reference to FIG. 4 of my copending application by using the same elements.

Centralized testing of the two branches, 6, 6$a$ for detecting and locating of undesired open or unstable connections in the protective circuits, if leakage location is not to be performed, may be made easier and more quickly in the switchgear room by using the following additional details as per FIG. 1, for automating of the manner of proceedings.

In each of the cells $b$, $g$, $c$, there are provided push buttons 76, 83, 85, respectively, connected in series with testing sources 77, 84 and 86, respectively, the frequencies of which differ from each other. The arrangement is connected to the common disturbance neutralizing amplifier 20 over the selector switch 21 and its further contacts 73, 74, 75, respectively. By the selector switch 21, a test voltage of any desired frequency thus can be imposed upon the bus-bars 6 and 6$a$ by the common bus-bar transformer 19. By turning the selector-switch 21 for instance to the position 73 and pressing the push button 76 in the switch-gear cell $b$, this test voltage 77 will be in resonance with only a circuit 37 of a far distant distributing box $e$, and will there operate a coil 38 in a closing contactor 30 by an amplifier A so that by any mechanical or electric timing device, such as a condenser-resistor circuit, the contactor 30 is held closed a desired short time, for instance during 2 to 10 seconds. In the switchgear room the operator may thus read on any of the instruments 8 and 8a in the cell b the total impedance in ohms of the two protecting branches 6, 6a in series from the said cell to the joint point 30 in desired distant distributing box, and he may also be able to detect, as to whether all of their connections in series, of the two branches 6, 6a, are reliable.

Figure 3B:
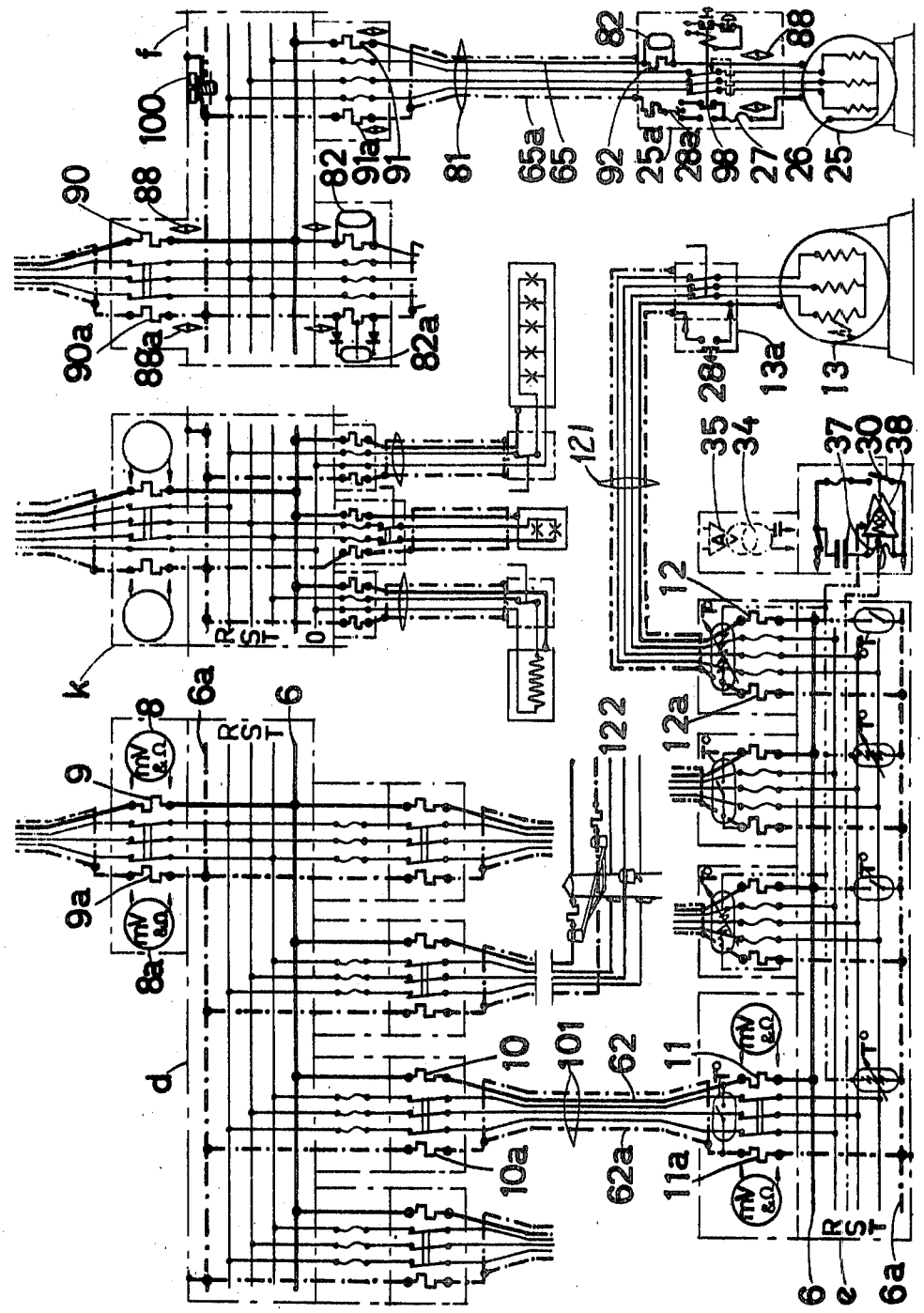

The centralized testing for detecting of undesired open or unstable connections in said protective circuits 6, 6a may also be performed by using an individual testing source in each outgoing main cable of the cells instead of using the common bus-bar transformer 19. As shown in FIG. 3A there is disposed in the cell c a leakage current wire testing transformer 93 in series with a push button 87 fed by an A.C. current testing source 89 with the main frequency or with a frequency different from that in any other cell. In a far distant distributing box, fed by this line of the cell c, but shown in box e in FIG. 3B there may be disposed either a tuned circuit 37 comprising capacitor and coil in combination with an amplifier A feeding the coil 38 of a contactor 30, or a relay and a contactor, in each case being provided with any timing device, as the occasion might require, which device automatically disconnects the contactor after a suitable time.

The centralized testing for detecting of undesired open or unstable joints in the protective circuits 6, 6a by using a common D.C. testing source instead of the common A.C. bus-bar transformer 19, or instead of the individual A.C. testing transformer 93, may offer certain advantages and may be performed by the following means as shown in FIGS. 3A and 3B.

In the switchgear cell a is, like the bus-bar transformer 19, inserted between the connections 14 and 6 a resistor 66 (or reactor or impeder, in the drawing as a resistor), fed by any D.C. testing source, which may consist of batteries, condensers or, as shown, of rectifiers 67, the rectifiers fed by an A.C. source 68 in series with a throw-over switch 69.

When throwing 69 to its upper position, a D.C. testing current will flow in the protective circuit 6, 6a in the same manner as described above, when using the common bus-bar transformer 19 and when the switch 30 in FIG. 3B has been closed in a distant distribution box e, or the push button 28 has been pressed down in a starting apparatus.

On the millivoltmeter 8, 8a in the concerned cell, the total ohmic resistance in the said closed protective circuit can be read off as well as the stability of the circuit connections can be shown as a steadily pointing.

When regularly throwing the switch 69 to the lower position and back to the upper positional manually, or automatically by using for instance the interrupting device 41 to 45, the testing D.C. pulses will be reversed and may influence the magnetically polarized bars 88 shown in f and in the starter 26a in the same manner as described in my said Pat. 3,031,613 referring to FIG. 4.

The testing for detecting of undesired open or unstable connections in the protective circuits with the use of a D.C. testing source, disposed in the individual leakage current wire 6 in each cell, is shown in the cell c in FIGS. 3A and 3B. The means are the same as those described above concerning the use of the common D.C. testing source, centrally disposed in the joint of the bus-bars 6 and 6a in the cell a. Thus, in the cell c a resistor (reactor or impeder) 97 is inserted, fed with testing D.C. from batteries, condensers or, as shown, rectifiers 96, with a throw-over switch 94 for manually or automatically (by means of 41 to 45) interrupting and/or reversing of the testing D.C. in the protective circuit. The rectifiers are fed by an A.C. source 95 of a desired frequency. If desired, an amplifier A can be disposed in a distant distributing box e, operating the coil 38 of a connector 30, as described above. Since the rectifiers 96 will produce a D.C. with an A.C. component, the use of a tuned circuit 37 is also possible, if desired.

Thus, if the protective circuit will be closed manually by pressing a push button in a starting apparatus as 28 or by a switch as 30 in the most distantly situated distributing box, or be closed automatically by a connector 30 in such a distributing box, said connector being operated by a tuned circuit 37, an amplifier or a relay, as desired, the operator can read off the total ohmic resistance and the reliability of the two closed branches 6, 6a of the protective circuit in 8, 8a in the actual cell. In those distributing boxes of the plant and in those starting apparatus through which the test current will pass, the same values may be read on the millivoltmeters, and, if regular interrupting with or without reversing of the testing D.C. will be used the magnetic bars 88 may perform oscillating movements, thus proving that the protective circuit is reliable and has no break.

It is useful to insert an additional common bus-bar transformer 19a with its amplifier 20a, as shown in FIG. 4A, in the conductor from the ground-electrode 14a to the bus-bars of the protective systems in the connection 14, for the following reasons;

The feeding of the two bus-bar transformers 19 (20), 19a (20a) from the same testing source makes it possible to impress on to the bus-bar and on to the ground-electrode 14a about the same voltage and the same polarity in relation to the bus-bar 6a of the cable sheaths.

Thus, the ground surface and the motor-frames connected to the leakage wire system 6 may be equipotentialized in relation to the cable sheaths, and in relation to the metallic housings of distributing boxes and of starting apparatus.

By solely feeding the testing transformer 19a it is possible to ascertain whether any of the motor-frames, distributing boxes or starting apparatus has a less solid contact to surrounding grounded objects.

Thus, if the housing of the distributing box d in FIG. 4B has contact to the surrounding ground and the testing transformer 19a solely will be excited by the operator, deflections may be read only on the millivoltmeter 8a in the switchgear cell b and on 8a in the distributing box d.

The insertion of a third common testing transformer 19aa in the bus-bar 6a of the cable sheaths, as shown in FIG. 4a, will render further useful possibilities, such as in combination with 19a for equipotentializing the ground surface and the electrically conducting cable sheaths 6a and the housings of distributing boxes and starting apparatus in relation to the leakage current wire system 6. Possible flowing of currents between the ground surface and housings of distributing boxes and starting apparatuses may be neutralized by that.

The insertion of an additional direct current testing equipment 66a, 67a and of a third such equipment 66aa renders principally the same possibilities as described here above in combination with the testing and neutralizing bus-bar transformers.

When interrupting without or with reversing of the testing current as described above, the deflections may be read on the millivoltmeters 8, 8a and may also be observed as oscillating movements of the magnetic bars 88, 88a, shown in f in FIG. 3B.

A disconnecting device 100 in the distributing box f is shown in FIG. 3B. It is useful in some fault locating and disturbance current neutralizing to know if the conductive housing of a distributing box makes contact or not with or is mounted to a conductive low ohmicly grounded extended girder system or building part in a plant. If contact exists, it can be detected by opening of said disconnecting device 100 and at the same time reading the millivoltmeter across 90a, while e.g. testing for joints continuity of the protective circuit with the common bus-bar transformers 19 or common bus-bar D.C. elements 66, or if testing for grounding, the millivoltmeters across 90a and 70a will usually show less deflection than before, and the meter across 90 will show a larger one, equally those across 91a, 92a, 92, 91, 90 and 70.

When a leakage has occurred in an intermittently working load object, for example, a motor, and when it may happen that this motor will be normally, perhaps automatically, stopped when the locating operation is just going on at the same instant, this locating operation then cannot continue, because the leakage current has ceased when the motor was just disconnected, and the deflection in the millivoltmeter or in the magnetic bars consequently has disappeared too.

In FIG. 3B, therefore, accumulating and integrating indicating devices 82, 82a are shown in the distributing box f adapted to store up the indications as summation meters, and to show the result as a color-changing in the indicating device, and appropriated to retain the changed color only during such time as desired after the fault current has ceased.

If the leakage current is rectified in only one direction, the color-changing indicator, as 82, will be suitable. The color will change back again more quickly, when a rectified current will be imposed in an opposite direction, that is, by using any of the D.C. testing sources 66 or 97 or by disconnecting the correct one of the rectifying devices 47, 48 as per FIG. 3A.

The color-changing indicator 82a in FIG. 3B is applicable either for A.C. or D.C. it may be provided with two rectifiers as shown or with only one placed in the center tap. The color will change back after a shorter or longer time as may be desired after the current flowing through the device has ceased.

Furthemore, in FIG. 3B, by way of example, shown applications of the measuring and controlling devices as described above and here placed in a starting apparatus 25a, shown as an automatic contactor.

The starting apparatus shown is equipped with two measuring resistors 92 (to only one of which is applied to the reference character for clarity), magnetic bars 88 and 88a, with two distant connecting points on the motor frame 25 to the leakage current wire 65 instead of normally one as shown on the motor frame 13, with a single-pole-double-throw automatic contact 98 and with a manually operated throw-over switch 28a.

When throwing the switch 28a to the position at right, the leakage current wire 65 and that of the cable sheath 65a will be connected together, since the contact 98 is closed, as shown, when the motor 25 is running.

When throwing the switch 28a to the left, the same circuit is closed, when the motor is stopped, and when throwing the switch 28a to the intermediate position, the circuit will be broken, disregarding whether the starter 25a is on or off.

Thus, by means of the switch 28a may be desired function of the starter 25a may be selected to be indicated and controlled in the different indicators 82, 92, 88 of the starter and in distributing boxes, such as in f, and finally in the switchgear cell c.

By using a separate wire as a return line of the leakage current wire from the motor frame 25 to the starter 25a, it will be possible, by testing the protective circuits as described above, for controlling the reliability of these two connections to the frame too, which may be especially useful in the case, when the motor is placed far outside of a plant and is being fed by an overhead line.

When the overhead line 122, shown near the distributing box d in FIG. 3B is provided with only one bare protective wire (a guard wire) fixed for instance on conventional porcelain insulators at the top of the posts, the said wire may be used as a leakage current wire 65 in these plants.

If the overhead line as shown in FIGS. 1B and 2B is equipped with two such bare protective wires, one of them may be used as the leakage current wire 65 and the other one as the conductor 65a.

When the protective and measuring circuits belonging to the two bus-bar branches 6, 6a are carrying no current under normal conditions, these circuits may be used as signal or telephone transmission lines as desired. For instance, orders and ordinary conversation may be sent from the switchgear room to all distributing boxes in the plant by using the common amplifier 20 and the common bus-bar transformer 19. Communication and orders can even be sent to a special place only, that is, to the starting apparatus 25a in FIG. 3B and, of course, also in the opposite direction, by using one of the individual test transformers, such as 93 in FIG. 3A. If thereby disturbance causing currents would exist in the circuit, they might be neutralized as desired by neutralizing, for instance, by using 19aa in FIG. 4A or 93a in FIG. 3A, respectively.

A breakdown anywhere in the plant between any of the conductors R–S–T will cause the pertaining fuses to blow or overload relays to release and will sometimes not give a ground fault indication in the millivoltmeter 18.

A breakdown between any of the live conductors and the zero-conductors, FIGS. 4A and 4B and 2A and 2B will cause the same occurrence—a phase fuse or an overload relay will operate and the ground fault voltmeter 18 usually will not show any deflection or indication in the switchgear cell a.

If, however, a contact would be made as a result of a flow in, or of a damage to a load object, for instance, in a heater such as 113, FIG. 4B, between its zero-conductor and its metallic cover, practically no current will flow in the fault contact point.

Because, however, even such a leakage is a symptom of a beginning occurrence of a defect that may continue to be a serious live conductor-to-ground-defect, it is necessary to detect it at once and to have it precisely located as soon as possible in order to have the fault repaired before a breakdown will happen.

If said contact made by default is low-ohmic, a voltage drop of the zero-conductor between the heater 113 and the neutral point n of the power source 1 would be large enough for imposing a leak current through the leakage current circuit 112, 6 in k, 109, 106, 7, 6, 16, 14, 56, 59, 60, 17, to n, and the leakage current would be signalled as a deflection in the leakage voltmeter 18 of the switchgear cell a and thereafter only in the instrument 8 of the cell g and in the instrument 8 in the measuring points 109 and 110 of the distributing box k, and the leakage thus is located.

If, in large networks, said deflection of the instruments 8 is varying and unstable, and if it might be useful to have the leakage current pulsated for easier identification, said pulsing would be performed by switching off the breaker 59 in the switchgear cell a and by switching the changeover switches 5 and 49 to the left, starting the pulser 45, 50 by closing 43 and reducing 3 until the leakage current has increased to an acceptable value, readable on the milliameter 2.

If, however (in case 1), said leakage point of 113 would be high-ohmic, or (in case 2) said voltage drop of the zero-conductor would be too small, or (in case 3) said zero-conductor would be a return conductor of lighting appliances having the bulbs connected symmetrically between each live conductor and the zero-conductor, for instance, giving a negligible differential current and thus a small voltage drop in the zero-conductor, said voltage drops would not be capable of producing a leakage current great enough for causing readable deflections on the leakage voltmeter 18 of the switchgear cell a.

The same will be the case when (in case 4) a zero-conductor of the network happens to contact the ground surface, or (in case 5) all of the live conductors, f.i. R–S–T, contact the ground surface simultaneously, and, with equal resistances.

By periodically using a megohm-meter 103 by closing the switch 104 and at the same time disconnecting the breaker 59 (when no "ground" indication can be read on the millivoltmeter 18), the total insulation resistance of the network, when the plant is running, can be tested, and an existing leakage between any zero-conductor in the plant and any one of the two protective branches 6, 6a, or between a zero-conductor and the ground surface 14a may thereby be detected, since the megohm-meter will show a too small megohm value, that is, a too small deflection of the pointer.

Since even a symmetric leakage to the ground surface in A.C. or D.C. networks (in cases 4 and 5), and, when an overhead line or a cable has gotten all of its two to four current carrying wires terminated in a load object accidentally soaked in water or liquid, will give no differential current to the neutral point of the power source, the leakage millivoltmeter 18 will show no deflection.

Such a symmetric leakage, however, will also be detected by the said megohm-meter by testing as described above.

After having detected a too low insulation resistance by the megohm-meter 103 as described, the locating of the unknown place of the fault will be performed as follows.

For the cases 1–3:

Assuming that an unknown leakage has occurred, such as mentioned before, in the heater 113, FIG. 4B or 2B between its current carrying zero-conductor and its electrically conducting enclosure, the starting of the common leakage current bus-bar test transformer 19 will cause that a test current flows in the circuit 16, 6 in the cell g, 7, 106, 109 in k, 6, 110, 112, 113, from the contact defect (leakage) to its zero-conductor, through the zero-conductors in the cable 107, distributing box k, in cable 105, switchgear cell g and through its zero-bus bar 0 to the neutral point n, through the details 17, 60, the closed breaker 59, 56, 14 and back to 16.

When said test current will pass through 56, the millivoltmeter 18 will show a deflection, and so will 8 in the cell g, 109 in the distributing box k and the millivoltmeter connected to 110 in the cable 107, feeding the heater 113.

The locating of the defect now has been performed and the leakage must be found in the heater 113.

Assuming in cases 1–3 that the unknown leakage is between the zero-conductor in the cable 107 and the cable sheath 112a or in the starting apparatus, then, by energizing the cable sheath bus-bar test transformer 19aa, a test current will flow through the following circuit starting from 19aa: in the cell g: 6a, 7a; in k: 109a, 6a, 110a, 112a, through its leakage in cable 107 or in its switchbox to the zero-conductor in said cable 107 and back through the zero-conductor in the same details to the neutral point n of the power source 1, and then through 17, 60, 59, 56, and back to 14 and 19aa.

Deflections will thus show up in 18 on the indication panel a and in 8a on the cell g, 109a in the distributing box k and eventually in 110a; therefore, the leakage must prevail between the zero-conductor and the cable sheath of the cable 107.

For the cases 1–3, the locating of especially high-ohmic leakage between the zero-conductor and either one of the protective conductors 6, 6a of the network also can be made by using an A.C. testing source, such as the pentode tube 47 placed in the adjustment wire of the switchgear cell a, f.i., in series to the regulating device 3. The switch 5 then is to be thrown to the left for locating, and the switch 49 is thrown to a desired position for choosing between pulsating, rectifying and reversing of the test current, and the breaker 59 is to be opened by 58. The current paths from the leakage 113 and 112a will go the same paths as described above right to the neutral point n, and therefrom through the leakage adjustment wire 17, 2, 3, and testing source as 47, further 41, 50, to 49; or 47–48 to 49; 52, 5, 51, to 16 and 14; instead of the way 17, 60, 59, 56, 14 and 16.

For case 4, it will be assumed that the cable 107 of the distributing box k is substituted with a three-phase overhead line, similar to 122 of the distributing box d, but having also a zero wire, that said zero wire has been accidentally broken and has dropped to the ground surface; the test current will flow through the following circuit by using the ground conductor testing transformer 19a; 19a, the ground electrode 14a, the ground surface right to the leakage place, the dropped zero-conductor, through the zero-conductor to the zero-bus-bar 0 of the distributing box k, through the zero-conductor of the cable 105 to the zero-bus-bar of the switchgear, to the neutral point n of the power source 1, from that through 17, 60, 59, 56, 14, to 19a and back to the ground electrode 14a.

Thereby, only the millivoltmeter 18 of the switchgear cell a will show a deflection and the existence of this type of defect will be signalled and detected in this manner.

Equally, the presence of the same kind of fault can be detected as a deflection in the milliammeter 2 by using the pentodes 47 and 48 of FIG. 4A or 2A as testing A.C. or D.C. sources disposed in series to the control device 3 of the leakage adjustment wire of the switch gear cell a; the switch 5 is then to be thrown to the left and 49 to the right and the breaker 59 opened. The test circuit then will be, seen from the testing source: 50, 49, 52, 5, 51, 16, 14, 14a, through the ground surface right to the dropped zero-wire, the zero wire of the overhead line 107, the zero-bus-bar of the box k, the zero-conductor of the cable 105, the zero-bus-bar of the switchgear cell g, the zero-bus-bar 0 of the switchgear right to the neutral point n of the power source 1, therefrom to 17, 2 and 3 back to the testing sources 47, 48.

A closer locating may be performed as follows without stopping the running of any load object in the plant or without disconnecting any current carrying zero-conductor, by using the 47, 48 as a D.C. test source according to the above, or using 66a in the ground electrode conductor, instead of using the test transformer 19a, and combining with indicators acting by D.C.

By using the magnetic bars 88, placed in the active zone of the zero-conductors, shown in cell g in FIGS. 4A and 2A and in box k in FIGS. 4B and 2B, the testing D.C. of 66a reversed by 69a or the testing D.C. of 47, 48 reversed by 41–42, may cause oscillating movements of some of the said bars; and the test current may be traced in the circuit from the switchgear to the place of the ground fault by observing the deflections in 18 and 2, respectively, in a manner described above, and the movements of the magnetic bars 88 near the zero-conductor in the switchgear cell g, and in the distributing box k and near the zero wire of the place overhead line of 107, and so on to the fault.

Instead of the D.C. testing source 66a, it is possible to use, for said locating of a contact-to-ground of a zero wire belonging to an overhead line, the earlier mentioned testing D.C. source 47, 48 of the leakage indication wire for producing a rectified testing current, pulsated and reversed as desired, and sending it out through 3, 2 to the neutral point n of the power source 1 and into the zero-network 0 (=zero) right to the leakage to the ground surface, therefrom returning through the ground electrode 14a, 14, 16, 51, 52, 49 to said D.C. testing source 47, 48.

A start of a poor contact (a loose or defective contact) anywhere in the energized network of a running plant may be automatically indicated as a general defect fault in the cell a of the switchgear room by using some new elements, described in the following, in combination with components and arrangements earlier described, having the two branches 6, 6a of the protective and measuring system serving as a signal transmission lines from the place of the start of a poor contact to the indication panel a in the switchgear room, the branch 6a consisting of the conducting internal cable sheath or of an internal conductor as a substitute for it. Said arrangements also make it possible to trace, locate and repair the start of a poor contact without stopping any part of the running plant.

In many cases such poor contacts in the live power circuits originate from vibrations, temperature changes or poor tightening of connections in distributing boxes, starting apparatus or load objects, and will usually generate heat, smoke and arcing, thereby soon causing a breakdown and a stop of the operations or sometimes even causing an open fire, if the start of the poor contact will not be promptly located and repaired. The new elements in these arrangements will consist of poor-contact-sensing bodies, such as detectors of vibrations, capacity variations of the power current carrying wire, in which the poor contact is to be found, of temperature rise, of smoke and of electromagnetic radiation and flash.

In FIG. 4B are shown, as an example, four temperature detectors as connecting devices in the shape of contact thermometers 120, disposed inside the distributing box $e$ and connected across two leakage current wire branches 6, 6a, which thus will be closed when any of the detectors 120 enters into function.

Another kind of detector for flash, vibrations and/or rise of temperature is shown at 119, symbolizing a transistor or a resistor, the latter having a high negative temperature coefficient. Four of these resistors are shown connected in parallel and connected to a suitable component inside the amplifier A, operating the coil 38 and the connector 30, which thus will close the branches 6, 6a, when any one of the resistors will reduce its resistance by feeling heat which emanates from a beginning poor contact in the distributing box.

As a signal current source may serve the common protective bus-bar transformer 20, 19 or the common D.C. source 66 in the switchgear cell $a$; and as a receiver of the general signal current, released by the beginning poor contact in the plant, the protective wire bus-bar transformer 19aa are the bus-bar resistor 66aa may suitably serve, across each one of which an amplifier A will be connected, which, if required, operates an alarming relay and signal bulbs in the switchgear room.

The function of the said arrangement for indicating and locating a start of poor contact of live conductors is described in the following.

Assuming a contact of the switch of the cable 101 in the distributing box $e$ starts to deteriorate while the plant is running, a contact thermometer above the switch will feel the heat generated in the poor contact by the current and will close the two wires 62, 62a. A signal current, imposed by 20, 19 in the switchgear room will flow in the following circuit: 16, 6, 7, in $b$; 61, 9 in $d$; 6, 10, 62, the contact thermometer in $e$, and back through 62a, 10a in $d$; 6a in $d$; 9a, 61a, 7a in cell $b$; 6a (19aa), 66aa, 14, 66, (19), 16.

In the switchgear room this signal current will induce a voltage in 19aa or will cause a voltage drop across 66aa and 66, thus operating an alarming relay.

When locating the place of the said poor contact, while the plant is still running, it will be found that in the switchgear room only the instruments 8, 8a in cell $b$ will show a specific deflection, and so will also be the case in 9a, 9 and 10a, 10 in the distributing box $d$, but not in 11a, 11 in the next distributing box $e$.

The place of the poor contact therefore must be located in the switch box of $e$, its housing must be opened, the connections inside the box inspected, and the beginning poor contact can be repaired by tightening it again, while the plant is still running.

The said temperature reacting device of the type 120 which had closed, must then be reset into its open position or must be replaced. The deflections in the instruments 8, 8a of the distributing box $d$ and of the switchgear cell $b$ will automatically cease and the alarming relay connected to 19aa (or 66aa) may be reset manually in the switchgear room by the operator.

When using resistors with negative temperature coefficient, such as 119, shown in the same distributing box $e$, it is suitable to use the amplifier A for operating the coil 38 of the connector 30 for closing the circuit 6, 6a in $e$, when any of the bodies 119 has been influenced by heat.

The operating manner will be exactly the same as described above in case the devices 120 are being used. In this case, however, the instruments across 11, 11a in $e$ will show the same deflections as the other instruments.

Another possibility of detecting a beginning poor contact in live circuits consists in the using of the protective bus-bar 6 in the distributing box $e$ as an antenna and 6a together with the cover of the box as a kind of ground.

If a contact begins to become poor, followed by arcing, the arc will generate electromagnetic waves and high frequency voltages in the surrounding wires and also in the protective wire bus-bar 6. Via the tuned circuit 37 these high frequency voltages operate the amplifier A which operates the coil 38 and closes the contactor 30, thus closing the signal circuit 6, 6a and giving a general signal of a beginning poor contact in the switchgear room as earlier described. Because the input terminals of the amplifier A will be automatically short-circuited when 30 closes 6, 6a, said contactor 30 again will drop to open position and the same process will be repeated. By means of a time-delaying device being disposed within the amplifier A, as earlier mentioned, said alarming signal for poor contact can be given by 30 a repetition rate differing as desired from that of other signals. The method of locating may be the same as described above as by using the detecting devices 120 or 119.

It is sometimes more suitable to use one or more separate wires 118 as antennae, or to combine them with the said bus-bar antenna 6.

It is possible that in some plants the generated high frequency currents of said beginning arcs in a distributing box may be transferred through cables and distributing boxes, following the protecting branch wire 6 as far as into the switchgear room and there passing from its protective bus-bar 6 through the points 16, 14 to the protective bus-bar 6a, or partly to the ground electrode 14a, thereby being measurable across any of the details (19), 66, 66aa, 19aa, or also across 66a, 19a, or possibly 56. The receiving instrument in the switchgear room may then be equipped with suitable tuned circuits and detectors for those high frequency currents and with amplifiers for operating the alarming relay as described above.

Two alarm bulbs connected in parallel and a drop relay for indicating a poor contact in the live circuits may, if desired, be disposed outside of each distributing box, and detectors of temperature, smoke, electromagnetic radiation, vibrations, etc. may be disposed in the surrounding electric details anywhere in a plant, as desired.

Instead of the common A.C. or D.C. signal sources 19, 19a, 19aa and 66, 66a, 66aa, respectively, in the protective bus-bars 6, 6a, in the switchgear room, the individual A.C. or D.C. signal sources in FIG. 3A as 93, 93a and 97, 97a in the switchgear cell $c$, or in a distributing box, as 35, 34 in $e$ in FIG. 3B may be used. The possibilities of receiving the signal current arriving into the switchgear room and of locating are the same as before. The extension and type of a plant constitute some of those factors which are determining the selection of combinations of signal sources and receiving devices as earlier mentioned.

It might be repeated that the object of the present invention is to produce means to detect, locate and, if possible, promptly to repair, while the plant is running, practically any beginning defect in any electric installation or in its surroundings, which defect otherwise would cause a stop of the operations all over the plant or a stop of single object, said means being designed in such manner that they automatically and continuously are supervising their own protective functions.

While the invention has been described and illustrated with respect to a certain preferred example which gives satisfactory results, it will be understood by those skilled in the art after understanding the principle of the invention, that various other changes and modifications may be made without departing from the spirit and scope of the invention and it is intended therefor in the appended claims to cover all such changes and modifications.

I claim:

1. In a system for detecting and locating beginning faults in and outside of energized electric networks for both A.C. and D.C. current and in their surroundings having lines consisting of circuits having cables, said cables having electrically conductive internal cable covers connected to a second bus bar, said cables having wires for carrying leakage currents, said wires connected to a first bus bar, said networks comprising controllers and load objects having frames, distributing boxes, switchboard cells, devices for excess-current protection for components in said network and a neutral point, said neutral point being connected by way of a wire for leakage current, signalling current and testing current adjustment to said first branch bus bar for leakage current wires, said leakage current wires forming integral parts of said cables, a regulating device for current limitation interruption and rectification interposed in said current adjustment wire, a current measuring instrument in said current adjustment wire and a switch for closing and opening and rectifying said connection between said regulating device and said first branch bus bar, said first branch leaking current wires being disposed in parallel to said main lines of said networks, said regulating device being adapted to prevent said leakage current from releasing said devices for excess current protection in said components, said first branch bus bar and said first branch leakage current wires serving as first branch test circuits, said first branch bus bar and said first branch leakage current wires in the switchboard cells comprising first a measuring resistor in each of said leakage current wires in said switchboard cells, second subsequent measuring resistors in said distributing boxes connected in series to said first mentioned resistors and to further first branch leaking current bus bars in the first and the following of said distributing boxes, said first and said subsequent measuring resistors having low resistance in relation to the impedance of said regulating device and of said leakage current and other currents appearing in said first leakage branch wires, indicator devices each comprising a voltmeter for indicating ground leakage signalling and testing current, said first and said subsequent resistors being adapted to be connected to said indicator devices, said indicator devices also comprising magnetically polarized bars located within the active zone of the magnetic field, said outermost of said leakage current wires of said first testing branch terminating in said frames of said load objects, said frames having no contact with said internal cable covers, said internal cable covers being connected in said switchboard cells to second branch measuring resistors and to said second bus bars and in said distributing boxes to second branch bus bars connected to the covers of said distributing boxes, said cable covers terminating in said frames of said controllers only to a ground electrode in said switchboard, said two bar branches system having in at least one switchboard a first common signal transformer fed by a first voltage amplifier, said transformer secondarily connected across said first and said second branch leakage current bus bars, said belonging first voltage amplifier, having its one input signal terminal connected to the neutral point of the power source, and its second by a two-position selector switch connected to some distrubance current generating load object, a plurality of switches in said distributing boxes and in controlling devices, said switches being connected across their two leakage current wire branches, said first common signal transformer, said first amplifier, said selector switch and said switches arranged for common neutralizing of disturbing currents appearing in said two leakage current wire branches and for common continuity testing of the joints of said circuits, said first amplifier being capable of changing the phase difference of input and output signal voltages for performing of said common neutralizing; said system comprising, in combination, for centralizing of said continuity testing of the joints of said two branches: in each one of said switchboard cells a push button in series with an A.C. signal voltage source in each one of said cells, the second terminal of said signal voltage source being connected to an own contact point of said selector switch and the second terminal of said push button being connected to the neutral point of the power source of the plant, and having in one of said distributing boxes a signal receiving voltage amplifier, a contactor for automatically opening and closing of said two leakage current bus bars, said contactor having a coil, said signal voltage receiving amplifier operating said contactor coil connected to its two output terminals, said voltage amplifier having an input circuit comprising capacitors and coils in combination connected across said two bus bar branches and across the two input terminals of said amplifier, said input circuit constituting a tuned circuit, said circuit being tuned to said A.C. frequency equal to that of the voltage signal source which will cause said signal voltage to operate said amplifier and said contactor only at said resonant frequency, said contactor closed during a short interval when said push button in said switchboard cell is operated.

2. The combination as set forth in claim 1, having in each one of said switchboard cells an individual neutralizing and testing signal transformer in each of said two leakage current conductors of said signal main lines, a transformer being fed by the output voltage of said voltage amplifier, which in series with a push button is connected to an A.C. signal source, and having in preferred control apparatus as starter in the plant a manually operated two-way selector switch having a neutral position in series with an other by said starter itself automatically operated two-way switch connected across said two leakage current conductor branches manually operated selector switch arranged, in positions to the right and left for verifying by the automatically closing of said two leakage current conductor branches if the pertaining load object is running or not and if said two protection conductor branches are continuous and reliable, or arranged in its center position for other useful testing purposes than leakage testing.

3. The combination as set forth in claim 2 and having in said switchboard a common bus bar D.C. signal source for joints continuity testing and neutralizing, connected across said two leakage current bus bars, said D.C. signal source consisting of a low-ohmic bus bar resistor with a center tap having two rectifiers connected across said resistor, a three-position change-over switch connected in series to the one terminal of an A.C. source, the second terminal of said A.C. source being connected to said center tap of said resistor, and electrolytically acting indicators connected across a shunt as a measuring resistor in series with said leakage current conductor in said distributing boxes and in said controlling apparatus of the plant, said electrolytically indicators having color-varying and storing properties for receiving an indication for a desired time.

4. The combination as set forth in claim 2 having in each one of said switchboard cells an individual neutralizing and testing D.C. signal source in each of said two leakage current conductors of said main lines, said D.C. signal source consisting of a resistor with a center tap, two rectifiers connected across said resistor, a three-positions change-over switch having a neutral position, said switch connected in series to the one terminal of an A.C. source, the second terminal of said source being connected to said center tap of said resistor, said changeover switch operating automatically and synchronously with said pulsing devices of said leakage current adjustment wire, regularly interrupting and reversing said produced neutralizing and testing D.C. voltage.

5. The combination as set forth in claim 1, further in said switchboard a common second and common third signalling, testing and disturbance neutralizing device, each comprising a said signal transformer fed by the output of a said voltage amplifier, said second device being inserted in the ground electrode conductor, said third device inserted in said second bus bar, a disconnecting device in said distributing boxes, said second and third neutralizing devices giving, in combinations, neutralizing effects of existing disturbance currents when locating a leakage and ascertaining the precise low-ohmic grounded object, said disconnecting device being adapted to disconnect, when necessary, the conductive envelope of said distributing box from second leakage current bus bar branch, if said envelope may be accidentally low-ohmic grounded, for promptly locating and repairing complicated leakage in an important part of a big plant without discontinuing the running thereof.

6. The combination as set forth in claim 5, further in said switchboard a common second and a common third neutralizing and testing bus bar D.C. signal source, said second device being inserted in the ground electrode conductor, said third device being inserted in said second bus bar, said D.C. signal testing sources and apparatus arranged, in combination for, among other things, said joint continuity testing and for said neutralizing when testing for grounds and for detecting and locating of the place of a broken and to ground dropped zero wire of an overhead line without discontinuing of the running of the plant.

7. The combination as set forth in claim 1 wherein a suitable length of said electrically conducting internal cover of said cables and a suitable length of said leakage current wires is arranged as substitute for said measuring resistors.

8. The combination as set forth in claim 5 wherein a cable, emanating from one of said switchboard cells or from one of said distributing boxes terminates in an overhead line, said line having one or two protective wires fixed to insulators at the top of posts, said protective wires serving as a continuation of one or both of said two leakage current wires and having measuring resistors, magnetic bars, electrolytic or other indicating devices included therein.

9. The combination as set forth in claim 1, having in a switchboard cell a megohm metering instrument having two terminals, one of said terminals being connected to the bus bar of said second leakage current wire branch, said other terminal being connected in series with a control switch to said neutral point of said network, said megohm meter periodically controlling the total ground insulation resistance of said network, for detecting the existence of any accidental ground fault of the live network and of a slowly deteriorating of the total insulation by growing symmetrically leakage to ground.

10. The combination as set forth in claim 1 and having detecting apparatus in said switchboard cells, distributing boxes, controlling apparatus and load objects of said network for smoke, heat, arcing, other electromagnetic wave radiation, circuit capacitance variations and the like, said detecting apparatus operating on the input terminals of said signal receiving voltage amplifier identical with or similar to said joint continuity testing amplifier with its controls in said distributing boxes and having alarming devices comprising in the switchboard cells in big plants receiving apparatus identical with or similar to said neutralizing common or individual signal transformers or D.C. signal source resistors connected to the input of their voltage amplifiers, the output of said amplifier connected to said alarming apparatus and as a signal current source, any of said other neutralizing transformer or resistor.

References Cited
UNITED STATES PATENTS 3,031,613  4/1962  Hojding _____ 324—52

GERARD R. STRECKER, Primary Examiner